United States Patent
Lloyd

(10) Patent No.: US 7,077,052 B2
(45) Date of Patent: Jul. 18, 2006

(54) STRUT ASSEMBLY WITH INVERTED AIR SPRING CONFIGURATION

(75) Inventor: Jeffrey M. Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 25 days.

(21) Appl. No.: 10/913,835

(22) Filed: Aug. 6, 2004

(65) Prior Publication Data

US 2006/0027093 A1 Feb. 9, 2006

(51) Int. Cl.
*F16F 9/04* (2006.01)

(52) U.S. Cl. .......... 92/98 D; 267/64.21; 267/64.24

(58) Field of Classification Search .......... 92/90, 92/98 D, 99, 105; 267/64.15, 64.19, 64.21, 267/64.23, 64.24
See application file for complete search history.

(56) References Cited

U.S. PATENT DOCUMENTS

| | | | |
|---|---|---|---|
| 4,518,154 A | 5/1985 | Merkle | |
| 4,629,170 A | 12/1986 | Warmuth | |
| 4,650,166 A | 3/1987 | Warmuth | |
| 4,655,438 A * | 4/1987 | Cameron | 267/64.21 |
| 4,747,587 A | 5/1988 | Ferrel | |
| 4,911,416 A | 3/1990 | Warmuth | |
| 5,009,401 A * | 4/1991 | Weitzenhof | 267/64.21 |
| 5,975,506 A | 11/1999 | Thurow | |
| 6,227,527 B1 * | 5/2001 | Berg | 267/218 |
| 6,386,523 B1 | 5/2002 | Crabtree | |
| 6,431,529 B1 * | 8/2002 | Maeda | 267/64.24 |
| 6,511,057 B1 * | 1/2003 | Berg | 267/64.21 |

* cited by examiner

*Primary Examiner*—Edward K. Look
*Assistant Examiner*—Michael Leslie
(74) *Attorney, Agent, or Firm*—Carlson, Gaskey & Olds

(57) ABSTRACT

An air spring assembly is mounted to a shock absorber to form a strut assembly. The shock absorber includes an outer cylinder with a shock piston and piston rod mounted within the outer cylinder. The outer cylinder includes a shock mount that is attached to a vehicle wheel. The air spring assembly includes an upper mount, which is attached to a vehicle body member, and a lower mount that is attached to the outer cylinder. An air spring piston is mounted to the upper mount via a bearing assembly to permit relative rotation between the air spring piston and the vehicle body member. A flexible member extends from the lower mount to a lower end of the air spring piston. The piston rod is mounted at one end to the shock piston and at an opposite end to the air spring piston. An isolator is mounted between the piston rod and the air spring piston to minimize shock loads.

23 Claims, 1 Drawing Sheet

STRUT ASSEMBLY WITH INVERTED AIR SPRING CONFIGURATION

TECHNICAL FIELD

The subject invention relates to an air spring assembly including an air spring piston that is mounted to an upper mount supported by a vehicle body member, and which includes a flexible member extending from the air spring piston to a lower mount attached to a shock absorber assembly.

BACKGROUND OF THE INVENTION

An air spring assembly is mounted to a shock absorber to form a strut assembly. The strut assembly is mounted between a vehicle wheel and a vehicle body member. The strut assembly dampens road load inputs to a vehicle to improve passenger ride and comfort.

In a traditional configuration, the air spring assembly includes an air spring piston supported by the shock absorber, a flexible member, an external support sleeve, and an upper mount. The flexible member has a lower end portion and an upper end portion. The lower end portion is mounted to the air spring piston and the upper end portion is mounted to the upper mount to form a sealed internal volume. The upper mount is attached to a vehicle body member.

The external support sleeve surrounds the flexible member. Due to shock articulation, the external support sleeve has to follow movement of the flexible member and typically includes a flexible mount, which is undesirable.

Also, packaging the air spring assembly onto the shock absorber is challenging because the air spring assembly has to create a counteracting sideload in the shock absorber. Further, the air spring assembly requires a large internal volume to move the spring rate down as required for passenger car applications.

One solution has been to mount the air spring piston onto a shock absorber body, which is formed as an outer cylinder. The air spring assembly is then either angled off a vertical axis defined by the shock absorber body, or rolling lobes of the air spring (formed by the flexible member) are angled to generate the required sideloads. One disadvantage with this solution is that the air spring piston diameter is increased to fit around the shock absorber body at a certain angle. Thus, the air spring assembly requires increased packaging space as a result of the increased air spring piston diameter.

It would be beneficial to provide an air spring assembly that reduces the diameter of the air spring piston and eliminates a flexible mount for the external support sleeve, while still providing a desired spring rate. The air spring assembly should also be easily packaged in a smaller area, as well as overcoming other known deficiencies.

SUMMARY OF THE INVENTION

An air spring assembly includes a lower mount, an upper mount that is spaced apart from the lower mount, an air spring piston that is supported by the upper mount, and a flexible member that extends from the lower mount to the air spring piston. In this unique configuration, the air spring assembly is inverted or flipped upside down from a traditional configuration. The air spring piston is mounted to the upper mount with the flexible member extending downward from the air spring piston to the lower mount. The lower mount is supported on a shock absorber assembly. This allows for a smaller air spring piston diameter, which reduces the amount of packaging space required for the air spring assembly.

The lower mount is formed for attachment to a shock absorber body. The upper mount is formed for attachment to a vehicle body member. The shock absorber body includes a shock mount that is formed for attachment to a vehicle wheel. The air spring assembly and the shock absorber assembly together form a strut assembly that is used to dampen road load inputs transferred from the vehicle wheel to the vehicle body member.

In one disclosed embodiment, the shock absorber body comprises an outer cylinder of a shock absorber assembly. A shock piston and piston rod are mounted within the outer cylinder. One end of the piston rod is attached to the shock piston and an opposite end of the piston rod is mounted to the air spring piston. An isolator is mounted between the piston rod and the air spring piston to dampen shock loads.

In one disclosed embodiment, the air spring piston is mounted to the upper mount with a bearing assembly. This permits the air spring piston to rotate relative to the upper mount. The upper mount includes a first bearing surface and the air spring piston includes a second bearing surface. The bearing assembly engages both the first and second bearing surfaces. In one configuration, the second bearing surface is formed as an outer peripheral flange that extends at least partially about an outer perimeter of the air spring piston.

Inverting the air spring assembly, by mounting the air spring piston on the upper mount, provides a simple and effective method and apparatus for reducing air spring piston diameter. This benefit improves packaging, while still providing the desired air spring rate. These and other features of the present invention can be best understood from the following specification and drawings, the following of which is a brief description.

DETAILED DESCRIPTION OF THE PREFERRED EMBODIMENT

Figure 1:
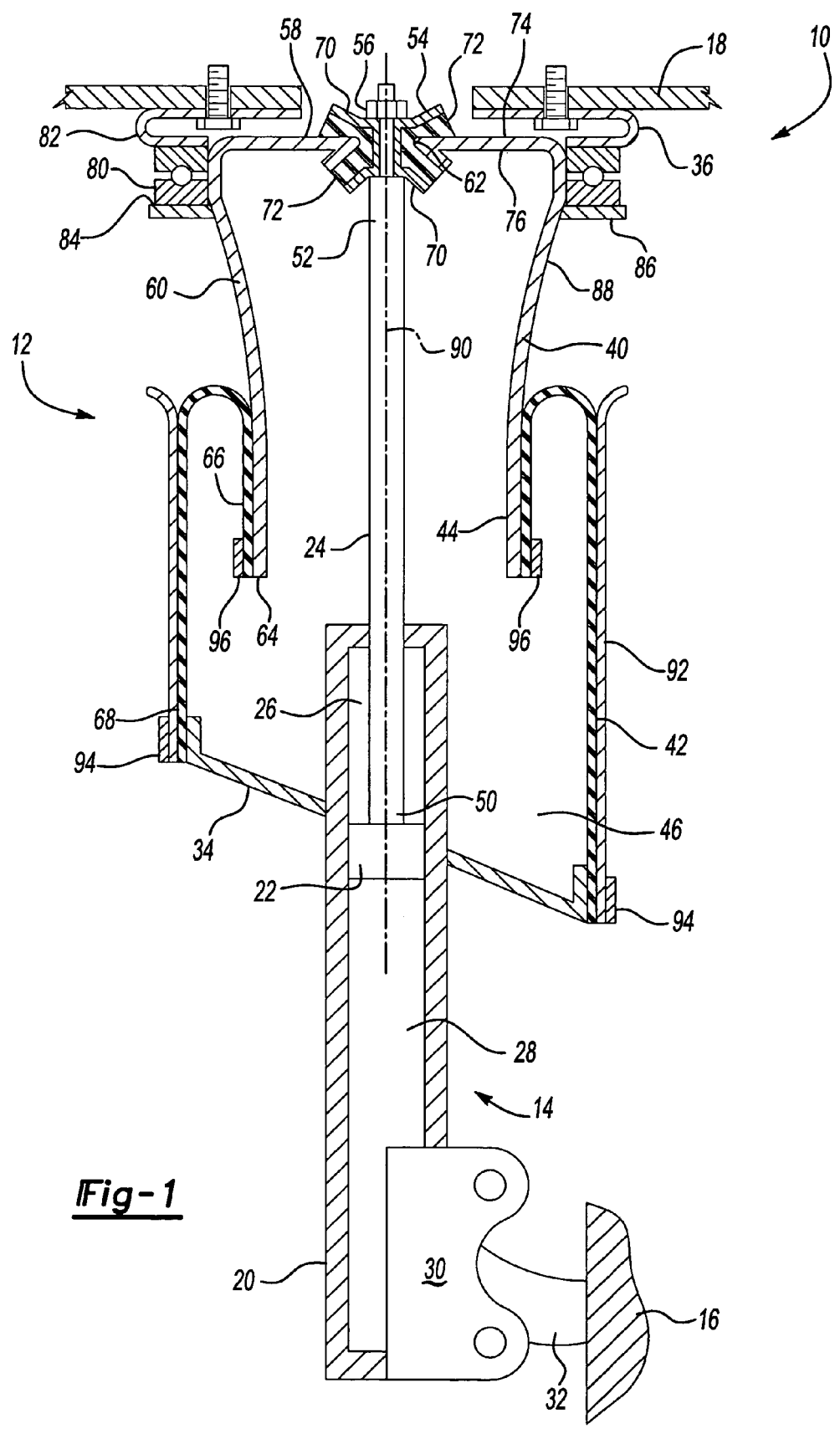
FIG. 1 is a schematic side cross-sectional view of a strut assembly incorporating the subject invention.

A strut assembly 10, shown in FIG. 1, includes an air spring assembly 12 and a shock absorber assembly 14. The strut assembly 10 is positioned between a vehicle wheel 16 and a vehicle body or frame member 18 to dampen road load inputs.

The shock absorber assembly 14 includes a shock body formed as an outer cylinder 20, a shock piston 22, and a piston rod 24. The shock piston 22 is slidably received within the outer cylinder 20 to separate the outer cylinder 20 into first 26 and second 28 chambers. A shock mount 30 is attached to the outer cylinder 20. The shock mount 30 is attached to a wheel mount structure 32 for the vehicle wheel 16.

The air spring assembly 12 includes a lower mount 34 mounted to the outer cylinder 20 and an upper mount 36 mounted to the vehicle frame member 18. An air spring piston 40 is supported by the upper mount 36. A flexible member 42 extends from a lower end 44 of the air spring piston 40 to the lower mount 34. The flexible member 42 defines an internal fluid chamber or internal volume 46.

A lower end 50 of the piston rod 24 is mounted to the shock piston 22 and an upper end 52 of the piston rod 24 is mounted to the air spring piston 40. An isolator 54 is mounted between the upper end 52 of the piston rod 24 and the air spring piston 40. Spring loads do not go through the isolator 54. The isolator 54 dampens only shock loads. The isolator 54 is fastened or otherwise attached to the upper end of 52 of the piston rod 24. In the embodiment shown in FIG. 1, the isolator 54 is attached to the piston rod 24 with a threaded fastener and nut 56. The isolator 54 is spaced apart from the vehicle frame member 18 and is positioned adjacent to the upper mount 36.

The air spring piston 40 is formed as a cup-shaped component having a generally flat base portion 58 with a tubular body portion 60 extending downwardly from the flat base portion 58. An opening 62 formed in the flat base portion 58 receives the isolator 54. The tubular body portion 60 extends to a distal edge 64. The distal edge 64 is sealed against an upper end portion 66 of the flexible member 42. A lower end portion 68 of the flexible member 42 is sealed against the lower mount 34. Any type of sealing interface, seal assembly, or sealing method known in the art could be used to seal the flexible member 42 to the air spring piston 40 and lower mount 34.

In one disclosed embodiment, the isolator 54 includes a rigid backing plate 70 with a resilient material 72 attached to the rigid backing plate 70. The isolator 54 is preferably configured such that the resilient material 72 directly engages both an upper surface 74 and lower surface 76 of the flat base portion 58 of the air spring piston 40.

A bearing assembly 80 rotatably supports the air spring piston 40 for rotation relative to the upper mount 36. The upper mount 36 includes a first bearing support surface 82 and the air spring piston 40 includes a second bearing support surface 84. The bearing assembly 80 directly engages both the first 82 and second 84 bearing support surfaces.

In one disclosed embodiment, the second bearing support surface 84 is formed as an outer peripheral flange 86 that is mounted to an outer surface 88 of the air spring piston 40. The outer peripheral flange 86 can be formed as part of the air spring piston 40 or can be separately attached to the air spring piston 40 by welding or any other known attachment method or apparatus.

The shock absorber assembly 14 includes a generally vertical axis 90 that is defined by the piston rod 24. Sideloads are generated by mounting the air spring assembly 12 at an angle with respect to the vertical axis 90. In another configuration, sideloads can be generated by mounting the air spring assembly 12 offset to the left or right of the vertical axis 90.

An external support sleeve 92 generally surrounds the flexible member 42. Traditionally, a flexible mount is required between the external support sleeve 92 and the flexible member 42 to accommodate shock articulation. However, with this unique configuration having the air spring piston 40 on top, the need for a flexible mount is eliminated. One end of the external support sleeve 92 can be directly mounted to the flexible member 42 with a crimp attachment 94 such that the upper end portion 66 of the flexible member 42 can move relative to the external support sleeve 92. A crimp attachment 96 can also be used for attachment of the upper end portion 66 of the flexible member 42 to the lower end 44 of the air spring piston 40.

Further, the unique configuration of mounting the air spring piston 40 to the upper mount 36 inverts or flips the air spring assembly 12 upside down when compared to the prior art. This innovation allows for a smaller piston diameter. Air spring rate is defined in U.S. Pat. No. 4,629,170 as being related to the effective area of the air spring piston 40 squared, while air spring rate response to the overall volume of the air spring assembly 12 is of the first order. This allows a smaller air spring assembly 12 to be packaged in a vehicle by using a smaller air spring piston 40 having a smaller effective area and by mounting the air spring piston 40 to the upper mount 36.

In a traditional configuration where an air spring piston is mounted to a shock absorber body, tilting of the air spring assembly is limited by the shock absorber body. By mounting the air spring piston 40 to the upper mount 36, the air spring assembly 12 can be tilted to a greater degree because the air spring piston 40 is being tilted toward the piston rod 24, which has a smaller diameter than the outer cylinder 20 of the shock absorber assembly 14. Thus, sufficient sideloads can be generated and sufficient spring rate can be generated with the unique configuration of an inverted air spring assembly 12 with a smaller air spring piston 40.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air spring assembly comprising:
    a first mount attachable to a shock body;
    a second mount attachable to a vehicle body member and spaced apart from said first mount;
    an air spring piston supported by said second mount, said air spring piston comprising a cup-shaped component having a generally flat base portion with a tubular body extending downwardly from outer edges of said generally flat base portion and wherein said generally flat base portion includes mounting structure for attachment to a shock body piston rod; and
    a flexible member extending between said first mount and said air spring piston.

2. The air spring assembly according to claim 1 including a bearing assembly for rotatably supporting said air spring piston for rotation relative to said second mount, said bearing assembly surrounding an outer circumference of said air spring piston.

3. The air spring assembly according to claim 2 wherein said air spring piston includes a first bearing support surface and said second mount includes a second bearing support surface with said bearing assembly directly engaging said first and second bearing support surfaces.

4. The air spring assembly according to claim 3 wherein said first bearing support surface comprises a flange mounted to an outer surface of said air spring piston and extending at least partially around an outer perimeter of said air spring piston.

5. The air spring assembly according to claim 1 including an isolator directly mounted to said air spring piston and positioned to be spaced apart from the vehicle body member when said second mount is attached to the vehicle body member.

6. The air spring assembly according to claim 5 wherein said isolator includes a rigid backing plate with resilient material supported on said rigid backing plate, said resilient material directly engaging two opposing surfaces on said air spring piston.

7. The air spring assembly according to claim 1 wherein said first mount includes a center opening for receiving the shock body and an outer peripheral flange portion in sealing engagement with said flexible member.

8. The air spring assembly according to claim 1 including an external support sleeve directly fixed to a lower end of said flexible member.

9. A strut assembly comprising:
a shock absorber including an outer cylinder;
a shock piston and a piston rod mounted within said outer cylinder; and
an air spring including a lower mount attached to said outer cylinder, an air spring piston spaced apart from said lower mount, and an upper mount supporting said air spring piston wherein said piston rod is mounted to said shock piston at one end and is mounted to said air spring piston at an opposite end.

10. The strut assembly according to claim 9 wherein said upper mount is attachable to a vehicle body member.

11. The strut assembly according to claim 10 including a shock mount supported by said outer cylinder wherein said shock mount is attachable to a vehicle wheel structure.

12. The strut assembly according to claim 11 including a flexible member having a first end fixed to said lower mount and a second end fixed to a lower end of said air spring piston.

13. The strut assembly according to claim 12 wherein an upper end of said air spring piston is mounted to said upper mount.

14. The strut assembly according to claim 7 including an isolator assembly mounted between said air spring piston and said piston rod.

15. The strut assembly according to claim 7 including a bearing assembly rotatably supporting said air spring piston for rotation relative to said upper mount.

16. The strut assembly according to claim 15 wherein said upper mount includes a first bearing support surface and said air spring piston includes a second bearing support surface and wherein said bearing assembly engages said first and second bearing support surfaces.

17. The strut assembly according to claim 9 wherein said air spring piston comprises a cup-shaped component having a generally flat base portion with a tubular body extending downwardly from an outer circumference of said generally flat base portion and wherein said generally flat base portion includes an opening defining a mounting surface for attachment to said piston rod.

18. A strut assembly comprising:
a shock absorber including an outer cylinder;
an air spring including a lower mount attached to said outer cylinder, an air spring piston spaced apart from said lower mount, and an upper mount supporting said air spring piston;
a flexible member having a first end fixed to said lower mount and a second end fixed to a lower end of said air spring piston; and
an external support sleeve fixed to one end of said flexible member such that an opposite end of said flexible member is movable relative to said external support sleeve.

19. A method of assembling a strut assembly comprising the steps of:
mounting a lower air spring mount to a shock body including a shock piston coupled to a piston rod;
mounting an air spring piston to an upper air spring mount spaced apart from the lower air spring mount;
mounting the piston rod directly to the air spring piston with an isolator; and
mounting a lower end of a flexible member to the lower air spring mount and an upper end of the flexible member to the air spring piston.

20. The method according to claim 19 including the steps of forming the upper air spring mount for attachment to a vehicle body member and mounting a shock mount on the shock body for attachment to a vehicle wheel.

21. The method according to claim 19 including the step of mounting a bearing assembly between the air spring piston and the upper air spring mount to permit relative rotation between the air spring piston and a vehicle body member.

22. The method according to claim 19 including forming the isolator with a rigid backing plate that supports resilient material, and connecting the isolator to the air spring piston such that the resilient material directly engages at least one surface of the air spring piston.

23. The method according to claim 19 including fixing a lower end of an external support sleeve directly to the lower end of the flexible member.

* * * * *